US009127722B2

(12) United States Patent
Nindel et al.

(10) Patent No.: US 9,127,722 B2
(45) Date of Patent: Sep. 8, 2015

(54) METHOD FOR PRODUCING A RESILIENT FORCE-TRANSMITTING MEMBER, AND RESILIENT FORCE-TRANSMITTING MEMBER

(75) Inventors: Wolfgang Nindel, Muehldorf (DE); Marc Brandl, Burglarchen (DE); Josef Stubenrauch, Rott am Inn (DE)

(73) Assignee: SGF SUEDDEUTSCHE GELENKSCHEIBENFABRIK GMBH & CO., KG, Waldkraiburg (DE)

( * ) Notice: Subject to any disclaimer, the term of this patent is extended or adjusted under 35 U.S.C. 154(b) by 32 days.

(21) Appl. No.: 14/002,821

(22) PCT Filed: Feb. 29, 2012

(86) PCT No.: PCT/EP2012/000873
§ 371 (c)(1),
(2), (4) Date: Oct. 4, 2013

(87) PCT Pub. No.: WO2012/116808
PCT Pub. Date: Sep. 7, 2012

(65) Prior Publication Data
US 2014/0291890 A1    Oct. 2, 2014

(30) Foreign Application Priority Data

Mar. 3, 2011    (DE) .......................... 10 2011 012 922

(51) Int. Cl.
*F16D 3/62*    (2006.01)
*F16D 3/78*    (2006.01)
(Continued)

(52) U.S. Cl.
CPC . *F16D 3/78* (2013.01); *B29C 45/16* (2013.01); *B29C 70/68* (2013.01); *F16D 2250/00* (2013.01)

(58) Field of Classification Search
USPC .......................... 464/17, 69, 93–96; 264/259
See application file for complete search history.

(56) References Cited

U.S. PATENT DOCUMENTS 3,439,081 A * 4/1969 Enderlein ..................... 264/112
4,031,714 A * 6/1977 Faust ............................. 464/69
5,766,675 A    6/1998 Andra et al.
(Continued)

FOREIGN PATENT DOCUMENTS

CH    321 633 A    5/1957
DE    35 26 273 A1    4/1987
(Continued)

OTHER PUBLICATIONS

International Search Report issued on May 25, 2012 in corresponding application No. PCT/EP2012/000873.

*Primary Examiner* — Josh Skroupa
(74) *Attorney, Agent, or Firm* — Carter, DeLuca, Farrell & Schmidt, LLP

(57) ABSTRACT

A method for producing a resilient force-transmitting member, in particular for transmitting torques for example in a motor vehicle or in an industrial application, wherein the force-transmitting member is provided with at least two receiving openings for connecting to force-transmitting components, an elastomer body and at least one inlay loop embedded in the elastomer body. The method includes positioning the at least one inlay loop in a predetermined desired position in a mold, providing at least one venting mandrel in the mold one free end of which is in contact with the inlay loop, injecting elastomer material into the mold, removing the at least one venting mandrel and vulcanizing the elastomer body.

13 Claims, 2 Drawing Sheets

(51) Int. Cl.
  *B29C 45/16*  (2006.01)
  *B29C 70/68*  (2006.01)

(56) References Cited

U.S. PATENT DOCUMENTS 7,250,002 B2 * 7/2007 Kotsusa .................... 464/69
7,871,331 B2   1/2011 Wahling et al.
8,460,113 B2 * 6/2013 Waehling et al. ........... 464/69
8,469,828 B2 * 6/2013 Brandl et al. ............... 464/69
8,512,154 B2 * 8/2013 Rothe et al. ................ 464/69

FOREIGN PATENT DOCUMENTS

DE    20 2008 016135 U1    3/2009
DE    20 2011 004309 U1    6/2011
WO    WO 2010031564    *    3/2010    ............ F16D 3/62

* cited by examiner

METHOD FOR PRODUCING A RESILIENT FORCE-TRANSMITTING MEMBER, AND RESILIENT FORCE-TRANSMITTING MEMBER

The present invention relates to a method for producing a resilient force-transmitting member, in particular for transmitting torques for example in a motor vehicle or in an industrial application, the force-transmitting member being provided with at least two receiving openings for connecting to force-transmitting components, an elastomer body and at least one inlay loop embedded in the elastomer body. The invention further relates to a resilient force-transmitting member which is produced by this method.

Force-transmitting members of this type are known from the prior art. For example, the document DE 10 2005 003 459 B3 shows a joint disc, which can be employed in a drive train of a motor vehicle or in a steering column. Joint discs of this type have a plurality of openings which are defined by bushes. In the joint discs, these bushes in each case in pairs have a plurality of loop bundles looped around them, so that tensile forces can be transmitted between two adjacent bushes. The bushes and loop bundles are embedded in an elastomer body. With joint discs of this type, it is thus possible, for example, to transmit torques between two shaft sections to be connected to one another, with in each case three of the bushes being connected to one shaft section and the bushes lying respectively between these bushes being connected to the other shaft section. Such a joint disc, owing to its resilient properties, can compensate for an axial offset and an angle between the two shaft sections due to cardanic deformation. Joint discs of this type are distinguished by a long service life despite their cardanic loading during operation, with a corresponding outlay on production.

Comparable force-transmitting members are also employed in couplings, these being formed merely by force-transmitting links, having two openings, with a single thread bundle looped around them, the thread bundle and the bushes being embedded in an elastomer body. Thread loops of this type also have a long service life with excellent force-transmitting behaviour despite their resilient deformability owing to the embedded inlay loop.

It has been found, however, that in force-transmitting members of this type various influences during production can adversely affect the service life. For example, gas or air inclusions at the loop bundle in the elastomer body can shorten the service life. Against this background, it is the object of the present invention to provide a method for producing a resilient force-transmitting member, and a correspondingly produced force-transmitting member, in which air inclusions at thread bundles during production can be largely prevented.

This object is achieved by the method described at the outset, which comprises the following steps:
positioning the at least one inlay loop in a predetermined desired position in a mould,
providing at least one venting mandrel in the mould, one free end of which is in contact with the inlay loop,
injecting elastomer material into the mould,
vulcanising the elastomer material,
venting during or after vulcanisation via at least one venting opening created by means of the venting mandrel.

According to the invention, it is thus provided that before elastomer material is injected into the mould for producing the force-transmitting member, first of all individual venting mandrels are positioned in the mould. These venting mandrels can be already formed on the mould or be displaceable in the form of slides in the mould. The venting mandrels create in the elastomer body venting openings, via which gas or air inclusions can escape from the elastomer body. This can take place even during the vulcanising, for example when the venting mandrels are of hollow form, or when they are withdrawn from the mould during the vulcanising of the. Alternatively, this can also take place after the vulcanising, for example by withdrawing the venting mandrels from the mould or removing the entire mould. In other words, gas inclusions or air bubbles which remain at the inlay loops during the injection of the elastomer material are, according to the invention, removed during the vulcanising or after the vulcanising by the gas or air escaping via the venting openings.

In principle, any venting opening provides a certain venting effect. Preferably, however, provision is made for the venting openings to be formed with sufficient certainty up to the inlay loop. For this reason, the method according to the invention provides that the venting mandrel penetrates with its free end into the inlay loop. Care is to be taken here that the venting mandrel does not damage the inlay loop itself, but only ensures that the venting opening created by the venting mandrel actually extends up to the inlay loop and optionally into the latter.

For simple introduction of the venting mandrel into the inlay loop and for easier removal of the venting mandrel from the elastomer material, it can be provided that the venting mandrel has, at least in sections, a conical shape. Furthermore, it is possible for the venting mandrel to be provided with a conicity or point at its free end. This too facilitates penetration of the venting mandrel to a sufficient depth into the inlay loop.

A development of the invention provides that the venting mandrel is of solid form or formed with a hollow space. If the venting mandrel is of solid form, the venting can take place only after removal of the venting mandrel. If it is formed with a hollow space, the venting can take place through the hollow space of the venting mandrel.

According to the invention, it can be provided that the inlay loop is formed by a thread bundle, the venting mandrel projecting into the thread bundle while displacing individual threads. Damage to individual threads of the thread bundle is avoided according to the invention.

A development of the method according to the invention provides that the at least one venting opening is closed with elastomer material or a material from an external source, after the venting. This measure makes it possible to obtain a force-transmitting member without openings, in which member sufficient venting has taken place via the originally formed venting openings, which have been subsequently closed. It is also to be regarded as subsequent closing of these venting openings when an individual venting mandrel has been removed during the vulcanising to allow venting to occur, and then during the vulcanising the originally formed venting opening is closed with vulcanising elastomer material.

The invention further relates to a resilient force-transmitting member, in particular for transmitting torques in a motor vehicle or in an industrial application, the force-transmitting member being provided with at least two receiving openings for connecting to force-transmitting components, an elastomer body and at least one inlay loop embedded in the elastomer body. Here, it is provided that the force-transmitting member is provided with at least one venting opening which extends through the elastomer body to the at least one inlay loop.

It can further be provided according to the invention that the venting opening has, at least in sections, a conical course.

A development of the invention provides that the force-transmitting member has a joint disc with a plurality of inlay loops which are arranged in the circumferential direction and are embedded in the elastomer body, at least one inlay loop, preferably each inlay loop, being assigned at least one venting opening. The individual venting openings can be arranged merely on one side of the joint disc or on two opposite sides. Furthermore, it is possible for each inlay loop of the joint disc to be assigned merely one or else more than one venting opening. Preferably, in this connection, it is provided that the venting opening is arranged in each case in a central region of the inlay loop between two receiving openings.

Alternatively to a joint disc, it can be provided that the force-transmitting member has a force-transmitting link with at least one inlay loop which is embedded in the elastomer body, the venting opening being arranged in a central region of the inlay loops between two receiving openings. Inlay loops of this type can be provided, for example, in coupling arrangements, for example so-called link couplings. Furthermore, it is possible for the at least one inlay loop to be formed in each case by a thread bundle.

The invention is explained below by way of example with the aid of the accompanying figures, in which.

Figure 1:
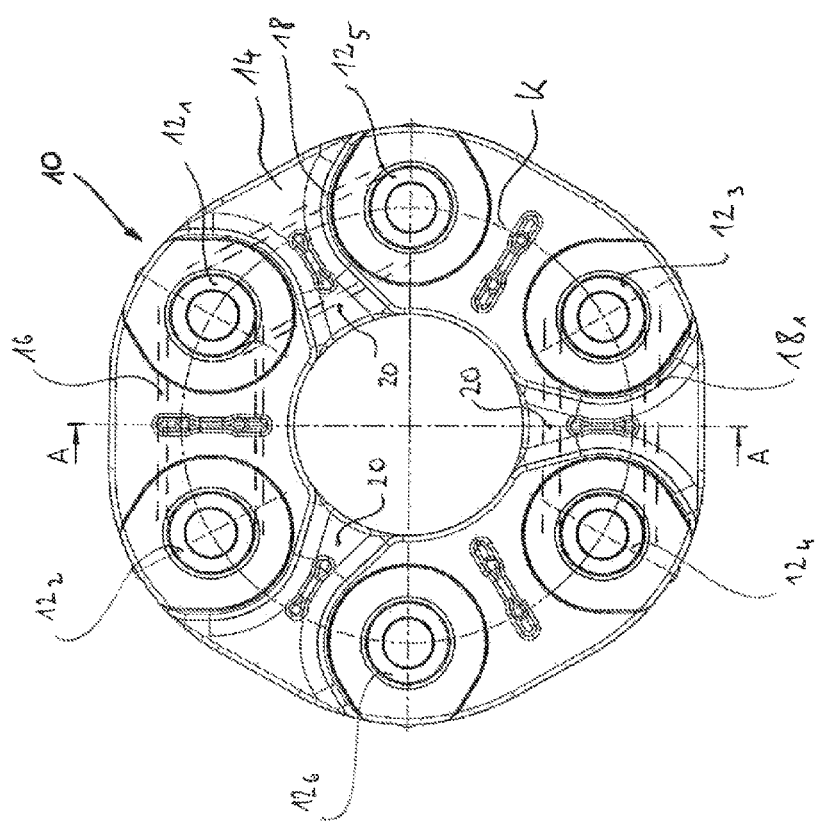
FIG. 1 shows a plan view of a joint disc according to the invention.

In FIG. 1, a force-transmitting member formed as a joint disc is shown in front view and designated generally by 10. This member comprises a plurality of bushes 12 which are arranged with their central points on a circular path K. The bushes are embedded in a rubber-elastic elastomer body 14. In the joint disc 10, there are embedded in each case a plurality of textile thread bundles 16, 18 which are enclosed by the elastomer mass. Reference is made in this regard to the sectional illustration according to FIG. 2. It can be seen there that, for example around the bushes $12_1$ and $12_2$ (see FIG. 1), there are arranged in each case two thread bundles $16_1$ and $16_2$ extending in different planes. Furthermore, a central thread bundle $18_1$ is looped around the bushes $12_3$ and $12_4$. The thread bundles 16 ensure a tensile force transmission between adjacent bushes. The embedding in the rubber-elastic mass 14 ensures dimensional stability of the joint body and at the same time the possibility of an elastic deformation, in order, for example, to transmit a torque between two shaft sections (not shown), the first shaft section being coupled to the bushes $12_1$, $12_3$ and $12_6$ and the second shaft section being coupled to the bushes $12_2$, $12_4$ and $12_5$. The joint disc 10 allows, in a manner known per se, also compensation for a certain axial offset between the shaft sections and compensation for an inclination of these shaft sections with respect to one another due to cardanic movements.

Figure 2:
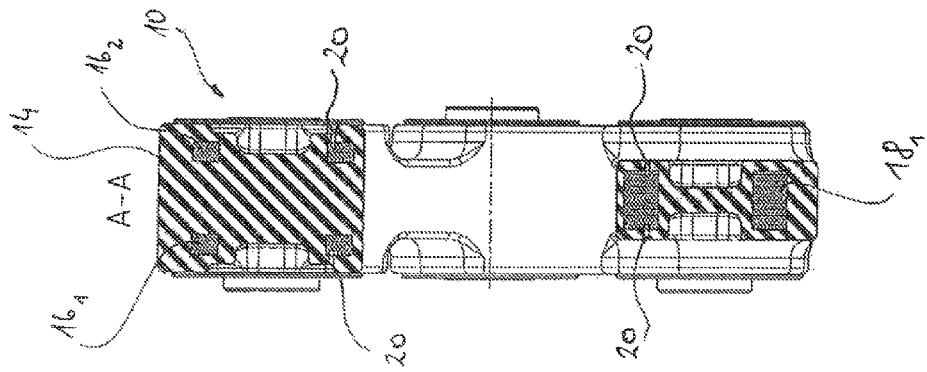
FIG. 2 shows a sectional view along the section line A-A from FIG. 1.

In FIGS. 1 and 2 there can further be seen venting openings 20 which are made in the elastomer body 14 during production and which extend from its outside surroundings to the respective loop bundles $16_1$, $16_2$ and $18_1$. In other words, the loop bundles are not isolated from the surrounding atmosphere, but connected to it via the venting openings 20. These venting openings 20 serve to ensure, during production, in particular during the vulcanisation of the elastomer body, that gas or air inclusions which result at the loop bundles during injection of the elastomer material into a mould can escape from the interior of the joint disc 10 and thus a service-life-reducing weakening of the joint disc owing to these gas inclusions can be avoided. These venting openings 20 therefore extend up to the thread bundles 16, 18, preferably even into them. They are obtained during production of this joint disc by suitable mandrels.

Overall, the provision of suitable air openings 20 results in a joint disc which is free from air inclusions and has an increased service life. If desired, the venting openings 20 can subsequently also be permanently closed with elastomer material or material from an external source.

Figure 4:
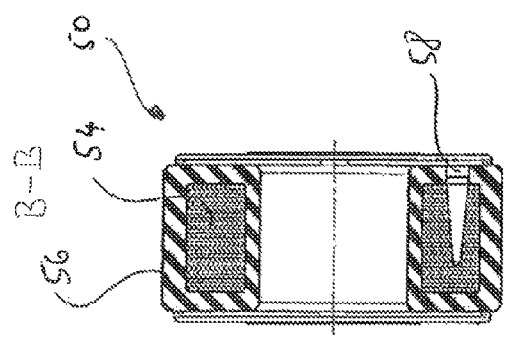
FIG. 4 shows a sectional view along the section line B-B from FIG. 3.
Figure 3:
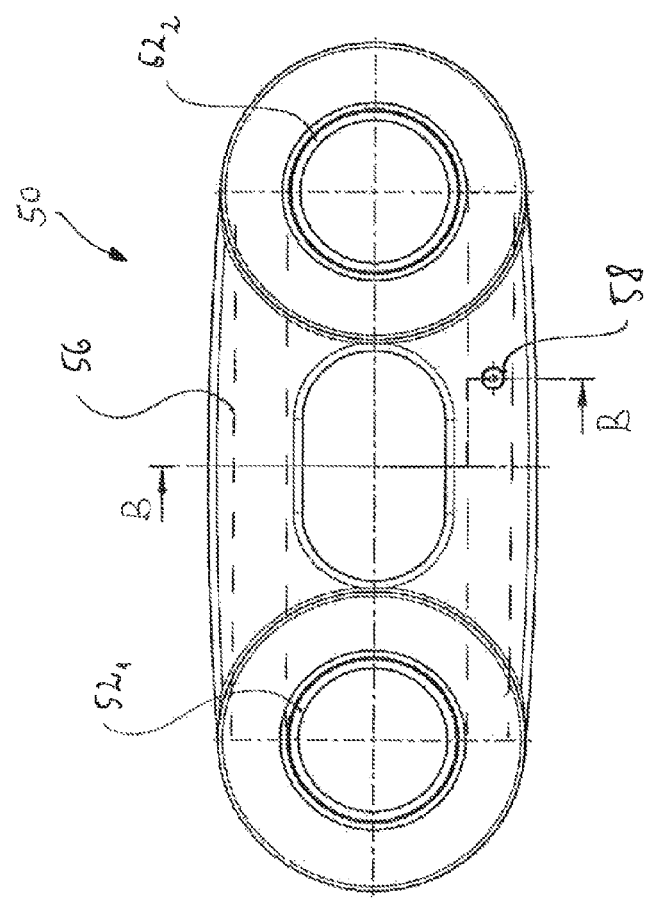
FIG. 3 shows a plan view of a force-transmitting link according to the invention.

FIG. 3 shows a force-transmitting link 50 which is used, for example, in a link coupling. This link also has two bushes $52_1$, $52_2$, around which a loop bundle 54 (see FIG. 4) for tensile force transmission is passed. The loop bundle 54 and the bushes $52_1$, $52_2$ are embedded in an elastomer body 56.

There can further be seen once again a venting opening 58 which is made in the force-transmitting link 50 for the same purpose as described with reference to FIGS. 1 and 2 for the joint disc. The venting opening 58 extends through the elastomer body 56 to the thread bundle 54 and into the latter. It has, at least in sections, a conical course in its inner region. It should be pointed out that the venting opening 58 does not damage individual threads of the thread bundle 54, but only displaces them a little during production. It is important that the air opening 58 establishes a connection between the loop bundle 54 and the surroundings, in order enables a venting and removal of air or gases which have been enclosed at the thread bundle 54 during injection of the elastomer material.

Overall, the measure, according to the invention, of providing venting openings results in an increase in the quality of corresponding force-transmitting members and thus a lengthening of the service life, for a relatively low additional outlay on production.

The invention claimed is:

1. A method for producing a resilient force-transmitting member for transmitting torques, the force-transmitting member being provided with at least two receiving openings for connecting to force-transmitting components, an elastomer body and at least one inlay loop embedded in the elastomer body, comprising:
    positioning the at least one inlay loop in a predetermined desired position in a mould;
    providing at least one venting mandrel in the mould one free end of which is in contact with the inlay loop;
    injecting elastomer material into the mould;
    vulcanising the elastomer material; and
    venting during or after vulcanisation via at least one venting opening created by means of the venting mandrel.

2. The method according to claim 1, wherein the venting mandrel penetrates with its free end into the inlay loop.

3. The method according to claim 1, wherein the venting mandrel has, at least in sections, a conical shape.

4. The method according to claim 1, wherein the venting mandrel is of solid form or formed with a hollow space.

5. The method according to claim 1, wherein the venting mandrel is provided with a conicity or point at its free end.

6. The method according to claim 1, wherein the at least one inlay loop is formed by a thread bundle, the venting mandrel projecting into the thread bundle while displacing individual threads.

7. The method according to claim 1, wherein the at least one venting opening is closed with elastomer material or a material from an external source, after the venting.

8. A resilient force-transmitting member for transmitting torques, comprising:
    at least two receiving openings for connecting to force-transmitting components;

an elastomer body;

at least one inlay loop embedded in the elastomer body; and at least one venting opening which extends through the elastomer body to the at least one inlay loop, wherein the at least one venting opening establishes a connection between the at least one inlay loop and an environment surrounding the resilient force-transmitting member.

9. The force-transmitting member according to claim 8, wherein the venting opening has, at least in sections, a conical course.

10. The force-transmitting member according to claim 8, wherein the force-transmitting member is a joint disc with a plurality of inlay loops including the at least one inlay loop which are arranged in a circumferential direction and are embedded in the elastomer body, the at least one inlay loop being assigned at least one venting opening.

11. The force-transmitting member according to claim 10, wherein the venting opening is arranged in each case in a central region of the inlay loop between two receiving openings.

12. The force-transmitting member according to claim 8, further comprising a force-transmitting link with the at least one inlay loop which is embedded in the elastomer body, the venting opening being arranged in a central region of the inlay loops between two receiving openings.

13. The force-transmitting member according to claim 8, wherein the at least one inlay loop is formed in each case by a thread bundle.

\* \* \* \* \*